(12) United States Patent
Alvarez et al.

(10) Patent No.: US 9,025,676 B2
(45) Date of Patent: May 5, 2015

(54) METHOD, SYSTEM AND DEVICE FOR IMPROVING VIDEO QUALITY THROUGH IN-LOOP TEMPORAL PRE-FILTERING

(75) Inventors: José Roberto Alvarez, Sunnyvale, CA (US); Lulin Chen, Cupertino, CA (US); Alexandros Michael Tourapis, Yorba Linda, CA (US)

(73) Assignee: GEO Semiconductor Inc., Santa Clara, CA (US)

( * ) Notice: Subject to any disclaimer, the term of this patent is extended or adjusted under 35 U.S.C. 154(b) by 336 days.

(21) Appl. No.: 13/545,930

(22) Filed: Jul. 10, 2012

(65) Prior Publication Data

US 2013/0003872 A1 Jan. 3, 2013

Related U.S. Application Data

(63) Continuation of application No. 11/230,943, filed on Sep. 19, 2005, now Pat. No. 8,218,655.

(51) Int. Cl.
| | | |
|---|---|---|
| *H04B 1/66* | (2006.01) | |
| *H04N 19/86* | (2014.01) | |
| *H04N 19/615* | (2014.01) | |
| *H04N 19/80* | (2014.01) | |
| *G06T 5/00* | (2006.01) | |
| *H04N 19/172* | (2014.01) | |
| *H04N 19/61* | (2014.01) | |
| *H04N 19/117* | (2014.01) | |
| *H04N 19/14* | (2014.01) | |
| *H04N 19/137* | (2014.01) | |

(52) U.S. Cl.
CPC .............. *H04N 19/86* (2013.01); *H04N 19/615* (2013.01); *H04N 19/80* (2013.01); *G06T 5/002* (2013.01); *H04N 19/172* (2013.01); *H04N 19/61* (2013.01); *H04N 19/117* (2013.01); *H04N 19/14* (2013.01); *H04N 19/137* (2013.01)

(58) Field of Classification Search
USPC ............... 382/260–265; 375/E7.135, E7.162, 375/E7.163, E7.181, E7.19, E7.211, 240.29
See application file for complete search history.

(56) References Cited

U.S. PATENT DOCUMENTS

| | | | | | |
|---|---|---|---|---|---|
| 5,053,857 | A | * | 10/1991 | Sandbank et al. | ........ 375/240.25 |
| 5,493,513 | A | * | 2/1996 | Keith et al. | .................... 709/247 |
| 5,493,514 | A | * | 2/1996 | Keith et al. | .................... 709/247 |
| 5,528,238 | A | * | 6/1996 | Nickerson | ........................ 341/67 |
| 5,532,940 | A | * | 7/1996 | Agarwal et al. | ............... 709/204 |

(Continued)

OTHER PUBLICATIONS

Final Office Action for U.S. Appl. No. 11/230,943, mailed on Dec. 6, 2011.

(Continued)

*Primary Examiner* — Aaron W Carter
(74) *Attorney, Agent, or Firm* — Sughrue Mion, PLLC

(57) ABSTRACT

A method, system and device are provided for pre-filtering device for filtering a video signal prior to digitally encoding. The method includes receiving at least one input picture and at least one reconstructed picture from an encoding process and performing an in-loop temporal filtering process using at least one input picture and at least one reconstructed picture from an encoding process to output a pre-filtered video signal for use in an encoding process. The result is enabling an encoding process to produce an output with increased temporal correlation between adjacent pictures regardless of the coding type, since the artifacts introduced by the encoding process are also considered by the process.

31 Claims, 12 Drawing Sheets

(56) References Cited

U.S. PATENT DOCUMENTS

| | | | |
|---|---|---|---|
| 5,535,138 A * | 7/1996 | Keith | 709/204 |
| 5,537,338 A * | 7/1996 | Coelho | 709/204 |
| 5,539,662 A * | 7/1996 | Nickerson | 358/1.15 |
| 5,539,663 A * | 7/1996 | Agarwal | 348/406.1 |
| 5,559,722 A * | 9/1996 | Nickerson | 341/50 |
| 5,638,068 A * | 6/1997 | Nickerson | 341/67 |
| 5,719,966 A * | 2/1998 | Brill et al. | 382/260 |
| 6,239,847 B1 | 5/2001 | Deierling | |
| 6,281,942 B1 * | 8/2001 | Wang | 348/607 |
| 6,996,186 B2 | 2/2006 | Ngai et al. | |
| 7,068,722 B2 | 6/2006 | Wells | |
| 7,346,226 B2 | 3/2008 | Shyshkin | |
| 7,403,568 B2 * | 7/2008 | Dumitras et al. | 375/240.29 |
| 7,430,335 B2 * | 9/2008 | Dumitras et al. | 382/260 |
| 7,860,334 B2 | 12/2010 | Li et al. | |
| 8,218,655 B2 * | 7/2012 | Tourapis et al. | 375/240.29 |
| 2003/0160899 A1 | 8/2003 | Ngai et al. | |
| 2004/0212734 A1 | 10/2004 | MacInnis et al. | |
| 2005/0036558 A1 * | 2/2005 | Dumitras et al. | 375/240.29 |
| 2005/0036704 A1 * | 2/2005 | Dumitras et al. | 382/260 |
| 2007/0002946 A1 | 1/2007 | Bouton et al. | |
| 2007/0064815 A1 * | 3/2007 | Alvarez et al. | 375/240.29 |
| 2007/0133896 A1 | 6/2007 | Boroczky et al. | |
| 2013/0003872 A1 * | 1/2013 | Alvarez et al. | 375/240.29 |
| 2013/0182971 A1 * | 7/2013 | Leontaris et al. | 382/275 |

OTHER PUBLICATIONS

Non-Final Office Action for U.S. Appl. No. 11/230,943, mailed on Aug. 5, 2011.

Final Office Action for U.S. Appl. No. 11/230,943, mailed on Feb. 2, 2011.

Non-Final Office Action for U.S. Appl. No. 11/230,943, mailed on Aug. 18, 2010.

* cited by examiner

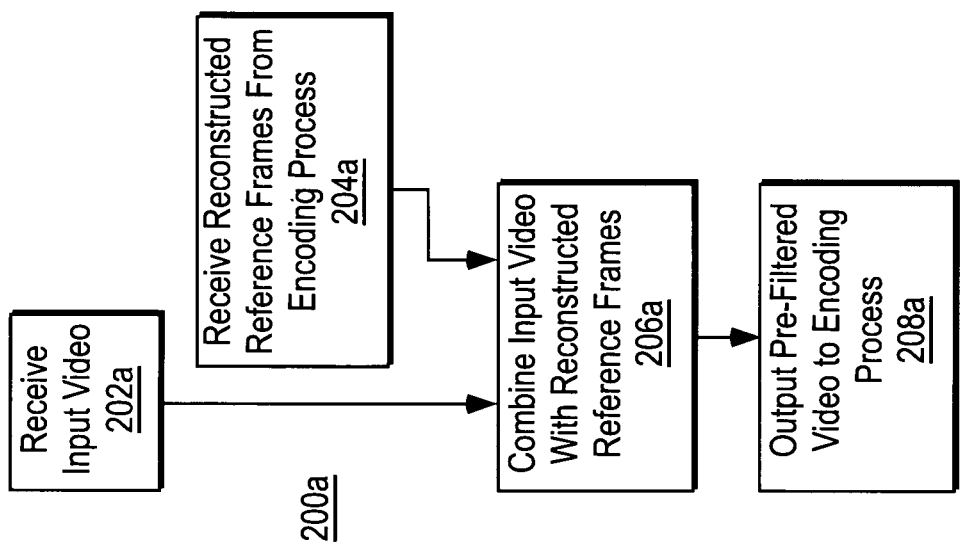

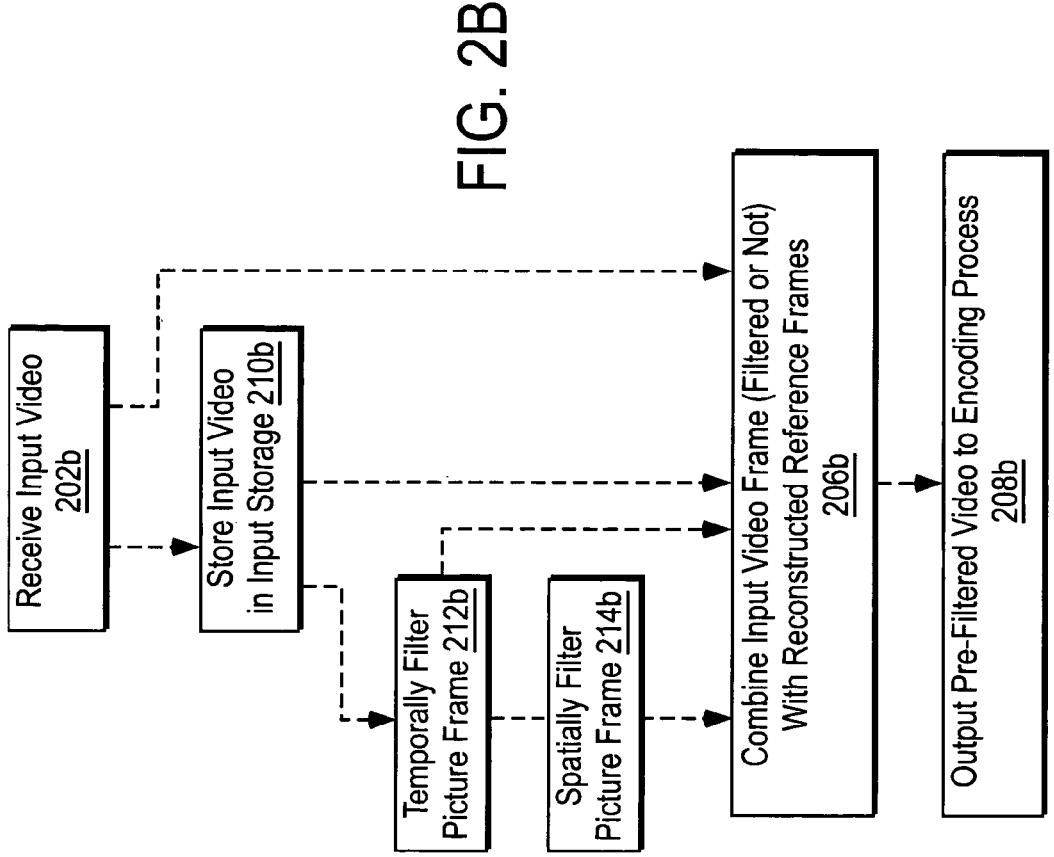

METHOD, SYSTEM AND DEVICE FOR IMPROVING VIDEO QUALITY THROUGH IN-LOOP TEMPORAL PRE-FILTERING

CROSS REFERENCE TO RELATED PATENT APPLICATIONS

The present application is a continuation of and claims priority under 35 U.S.C. §120 to U.S. application Ser. No. 11/230,943, entitled "Method, System and Device for Improving Video Quality through In-Loop Temporal Pre-Filtering," filed by Alexandros Michael Tourapis et al., on Sep. 19, 2005, now U.S. Pat. No. 8,218,655, which is hereby incorporated by reference in its entirety.

BACKGROUND

Removing noise from a video signal before the signal is encoded is an important feature of most modern video encoding architectures, since it can considerably enhance coding efficiency while at the same time improve objective and subjective quality of the resulting encoded video signal. Digital still or video pictures can contain noise due to the capturing process, the analog to digital conversion process, transcoding along the delivery channel, transmission effects, or other reasons. Of course, noise causes effects that a user can perceive in the video display, causing a visually displeasing picture. It can also have a severe adverse effect in many video applications, particularly video compression. Due to its random nature, noise can considerably decrease spatial and temporal correlation, thus limiting the coding efficiency of such noisy video signals. Furthermore, at low bit rates, the uncorrelated compression artifacts between successive pictures coded with different encoding modules can lead to temporal artifacts in the way of flicker or pulsation between pictures. Thus, it is desirable to remove noise. However, it is important to also not remove any of the important details of the picture, such as edges or texture.

Several conventional algorithms exist where removal of noise, or de-noising, is performed using spatial or/and temporal methods. Such noise reduction schemes can be spatial in nature, addressing one frame at time. Conventional spatial algorithms tend to remove spatially redundant information and noise. Conventional temporal schemes, apart from removing noise and enhancing details such as edges that may be lost due to spatial filtering, also tend to enhance temporal correlation between adjacent frames. However, these conventional architectures consider this process outside the encoder loop. As a result, no consideration of the artifacts introduced by the encoding process is made.

Many noise reduction schemes in the context of pre-processing that occur prior to compression address coding efficiency and improved subjective quality compared to coding an unfiltered source. In this context, knowledge of the encoding process could lead to further improvements both subjectively and objectively, but to date have not been considered. Conventional temporal filtering methods may consider motion compensated methods for advanced performance. However, feedback typically exists from the encoder in terms of adapting certain parameters of the filtering process, such as those based on the target bit rate, increasing or decreasing the filtering applied on the current picture. These methods still do not include any information about the nature of previously coded pictures.

Conventional schemes can be used for addressing coding efficiency and subjective quality compared to coding an unfiltered source, but none exists that adequately addresses temporal artifacts that are apparent as defects in the resulting video picture. More specifically, it can be observed that at very low bitrates using fixed GOP (Group Of Pictures) structures (i.e. a repetitive sequence of intra-coded (I) pictures followed by a sequence of inter-coded (P and B) pictures) can result in distinct temporal artifacts (i.e. a pumping/beating/pulsation picture effect) at GOP boundaries. These artifacts are a result of the different coding artifacts introduced by the different picture/prediction coding types, and the lack of temporal correlation at GOP boundaries. These artifacts are apparent in all existing video compression standards, such as MPEG-2[1] and MPEG-4, but can be even more prominent for standards such as JVT/H.264/MPEG AVC [2], where additional processes are applied for intra and inter coding, including the prediction process and de-blocking. These artifacts can persist even though a conventional spatio-temporal pre-filtering scheme is used, regardless of the resulting increase in temporal correlation between adjacent original filtered pictures.

Therefore, given conventional solutions, there still exists a need for adequately removing such artifacts from a video picture. As will be seen, the invention resolves this need in an elegant manner.

BRIEF DESCRIPTION OF THE DRAWINGS

FIG. 2A is a process flow chart for an in-loop temporal filter according to one embodiment of the invention;

FIG. 2B is a process flow chart for an in-loop temporal filter according to one embodiment of the invention;

DETAILED DESCRIPTION

Figure 1A:
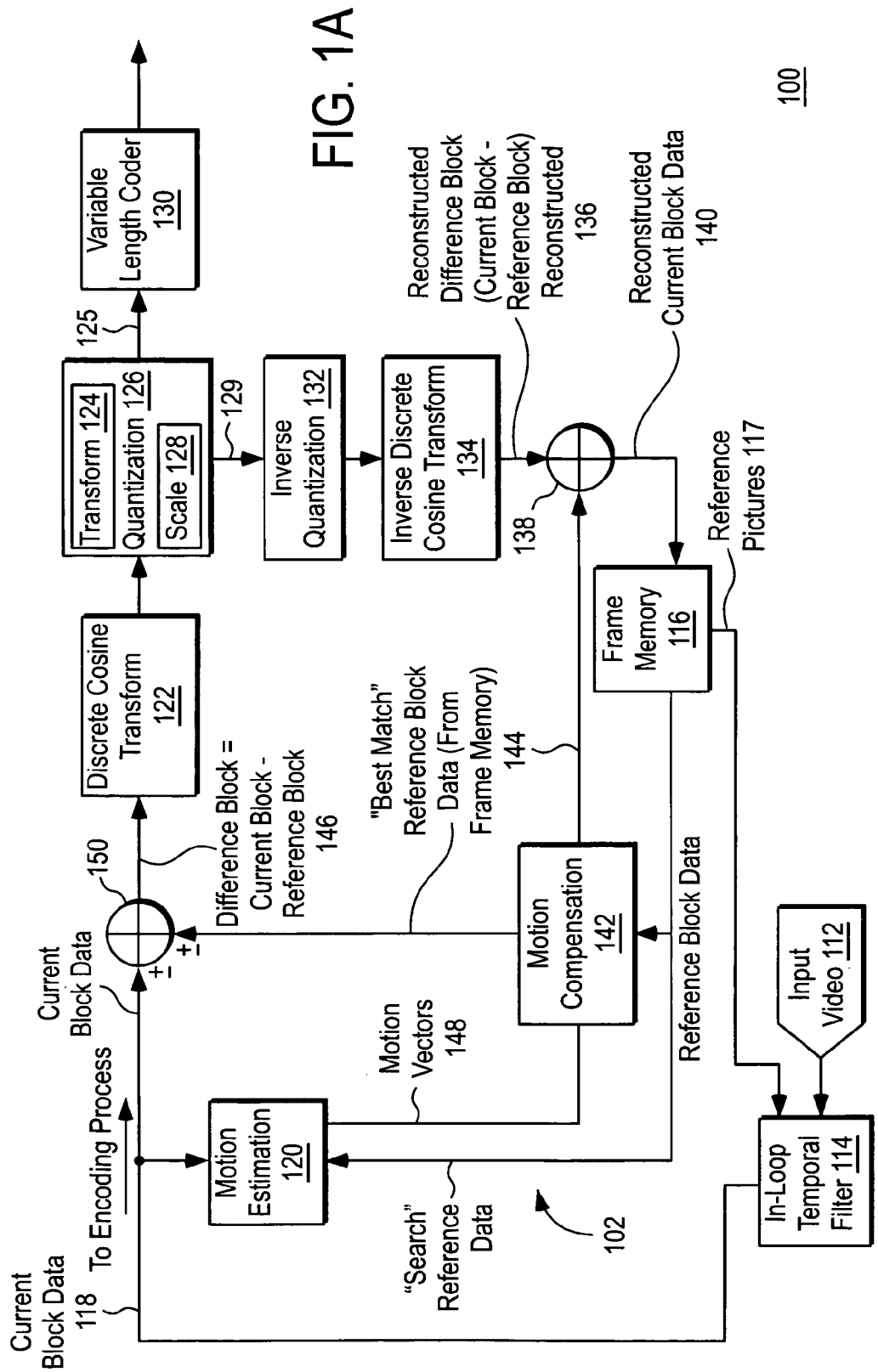
FIG. 1A is a diagrammatic view of an in-loop temporal filter according to the invention, communicating with a generalized encoding process.

According to the invention, knowledge of the encoding process is used to provide further improvements to video quality, both subjectively and objectively. The invention relates to the general class of hybrid motion compensated entropy based encoders referred generally in this document as "MPEG Encoders", which may include MPEG, MPEG2, and other encoder standards. The invention provides an additional pre-filtering step that is introduced prior to the encoder, where previously reconstructed pictures are also used for temporal filtering within this process/loop. This has the implication that temporal correlation will also increase between adjacent pictures regardless of the coding type since the artifacts introduced by the encoding process are also considered by the filter. This may be applied on a regional basis or on a frame by frame basis, depending on the application. This may also be applied in a pixel by pixel, block by block, or macroblock by macroblock basis, depending on the application. For the purpose of description in this discussion, let us assume that the terms block and macroblock are interchangeable and are meant to denote some two-dimensional region of the picture of any size. Also, the processing of picture data may be performed from top to bottom of a frame or in or other orientations. The input picture frame data and pre-encoded frame data may be processed linearly in time, or may be processed in a non-linear fashion. Those skilled in the art will understand that, given the description below, various processing methods can be easily derived to process incoming video signals together with pre-encoded picture data to produce an improved input for an encoder process. Such methods would not depart from the spirit and scope of the invention, which is defined by the appended claims and their equivalents.

According to the invention, a novel architecture, which is called in-loop temporal pre-filtering, is proposed where a novel in-loop temporal filter is provided. In one embodiment, an in-loop temporal pre-filter is provided for filtering a video signal prior to digital encoding. The filter includes one input configured to receive one or more input video picture frames, and another input for receiving one or more reconstructed pictures from an encoding process. Within the in-loop temporal filter, logic is configured to combine data related to at least one input video frame and at least one reconstructed picture from the encoding process to output a pre-filtered video signal for use in an encoding process. This logic may be configured in hardware, coded in software, or alternatively configured with a combination of hardware and software to produce the optimum result. Those skilled in the art will understand that there may be various configurations that can be made using logic hardware as well as software without departing from the spirit and scope of the invention, which, again, is defined in the appended claims and their equivalents.

According to the invention, the novel in-loop temporal filter can be configured to process a single pre-encoded frame, such as reconstructed frames stored in a frame memory, as described in the embodiment below. Alternatively, the novel filter can be configured to process multiple pre-encoded frames. Similarly, the novel in-loop temporal filter can be configured to process either a single input picture frame or multiple input frames. The invention provides an in-loop temporal filter that is able to combine input picture frame data and encoded frame data in a novel way to produce an improved pre-filtered input to an encoder process that can then produce an encoded output with improved temporal correlation and reduced artifacts in the output video signal from the encoder process.

In another embodiment, the in-loop temporal pre-filter may be configured to continue and further refine the picture conditioning operations begun by conventional video pre-processing, where the input pictures may be first temporally and then, in some embodiments, spatially filtered. They may also be first spatially and then temporally filtered, or simultaneously temporally and spatially filtered then output to the in-loop temporal filter to provide a signal for use in conventional encoder architectures. Referring to FIG. 1A, one embodiment of the novel filtering architecture is illustrated, where additional pre-filtering, Module 114, is performed that considers a current input picture data and pictures from an encoder process as well. Thus, the in-loop temporal filter receives an input video signal, which can define a video picture frame, and also receive previous picture frame data from an encoding process, such as, for example, from a frame memory or storage that contains data related to reconstructed picture frames. The output of the in-loop temporal filter is a pre-processed or pre-filtered picture frame that results from the novel in-loop temporal filtering process.

Regarding FIG. 1A, the general illustration includes a flow diagram of a generic encoder 102 that includes a discrete cosine transformer, a quantizer, a variable length coder, an inverse quantizer, an inverse discrete cosine transformer, motion compensation, frame memory, and motion estimation. The system of FIG. 1A incorporates one embodiment of the novel in-loop temporal filter configuration appended to the encoder process. Those skilled in the art will understand that the filter may be alternatively configured together with or separate from the coder control, and could also possibly be incorporated into another component, but the invention is not intended to be limited to any particular configuration. The invention is intended to extend to any configuration where a pre-filter process receives an input video signal, which may include video picture frame data and related data, and also receives reconstructed video frame data from an encoding process, and then combines the data together to produce an in-loop temporally filtered output signal to input into an encoding process.

The method, system, and program product may be implemented in or otherwise in conjunction with most any encoder configuration. Such an encoder may be configured according to existing video coding standards such as the ISO MPEG and ITU-T H.26X standards, or architectures (Microsoft's VC1, On2 etc). Referring again to FIG. 1A, an architectural diagrammatic representation of a generalized encoder 102 is illustrated, included along with the novel in-loop temporal filter 114, which, due to its independent operation from the encoding process, may be considered a device or a system, 114.

In operation, the picture input 112 is received by the in-loop temporal filter 114. According to the invention, this filter operation uses new pictures that are received as an input, as well as reconstructed block data from storage in frame memory 116, and temporally filters the two inputs resulting in an input to the encoder of current block data 118. In alternative embodiments, the in-loop temporal filter is further configured to receive an input of motion vectors from the Motion Estimation unit 120, or alternatively from statistics storage related to the pre-filtering process, and these separate embodiments are described further below in connection with FIG. 1E and other figures and related description.

The in-loop temporal filter, 114, still referring to FIG. 1A, is the pre-filtering unit that is configured to receive an input video signal, uniquely combine it with video picture data, such as reconstructed frames, taken from an encoder process, and to output an in-loop filtered picture frame. The embodiment below is described as an in-loop video pre-filter that receives encoded picture frame data and combines it with input picture frame data in a novel way, and it broadly includes the various manners in which such picture frame data is combined to produce an improved video input to an encoder, and which will ultimately produce an encoded output with improved temporal correlation and reduced artifacts in the output video signal from the encoder process.

In one embodiment, and in contrast to a video pre-processor that is configured to process pixel data in raster scan order (one horizontal line of video at a time), the in-loop filter may operate as a pre-processor that processes data in block order, one block at a time or multiple blocks at a time, possibly in a row of blocks across the picture. In another embodiment, the in-loop filter may operate as a pre-processor that processes data on a block by block basis, considering either one block at a time or multiple blocks. Furthermore, whether the in-loop filter processes the data at any block size or level, the order in which the picture frame data is processed may be linear, or non-linear. Still further, an image in a picture frame may be processed from top to bottom, bottom to top, or in other known manners of processing video picture data, which can vary among particular applications. In either configuration, the invention is not limited to any particular order in which picture frame data is processed, or the manner or scope in which the picture frame is processed. Those skilled in the art will understand that the invention, given this detailed description, may take on different configurations to optimize video input data to an encoder process, again to ultimately produce an encoded output with improved temporal correlation and reduced artifacts in the output video signal from the encoder process, without departing from the spirit and scope of the invention, which, again, is defined by the appended claims.

Referring to FIG. 1A, one embodiment of the invention is illustrated where at input 112, a video input signal, such as data defining a video picture frame or the equivalent, is received by in-loop temporal filter 114. In-loop temporal filter 114 further receives reconstructed picture frames from frame memory 116, which is located within the encoder process, or encoder loop. Again, it will be understood by those skilled in the art that the frame memory 116 is a common component of an encoder process, particularly those that are compliant with ISO MPEG, ITU-T H.26x and other video coding standards. According to the invention, the in-loop temporal 114 is configured to receive the input video picture frame and to combine it or otherwise compare it to a referenced reconstructed picture frame from frame memory 116, and then output an in-loop temporally filtered signal to be received as an input to an encoder process. A system configured according to the novel system and method will, as a result, produce an improved temporally filtered signal from the in-loop temporal filter 114, which will ultimately produce an encoded output with improved temporal correlation and reduced artifacts in the output video signal from the encoder process.

Figure 1B:
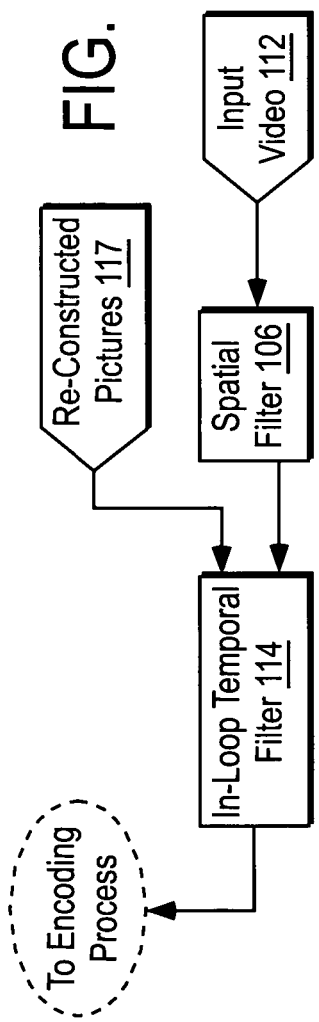
FIG. 1B is a diagrammatic view of an in-loop temporal filter according to one embodiment of the invention.

Referring for FIG. 1B, another embodiment of the novel pre-filtering system is illustrated. The same in-loop temporal filter 114 is configured to receive a reconstructed picture 117, for example, a picture from frame memory 116 (FIG. 1A). Furthermore, according to the embodiment illustrated in FIG. 1B, the in-loop temporal filter 114 is further configured to receive a spatially filtered signal from spatial filter 106 that initially receives the input video signal 112, such as an input video picture frame. According to this embodiment of the invention, the improved pre-filtering process spatially filters the input video signal prior to the in-loop temporal filtering in in-loop temporal filter 114. According to this embodiment of the invention, the added improvement of spatial filtering prior to in-loop temporal filtering further enhances the ultimate output signal that is encoded in the encoding process.

Figure 1C:
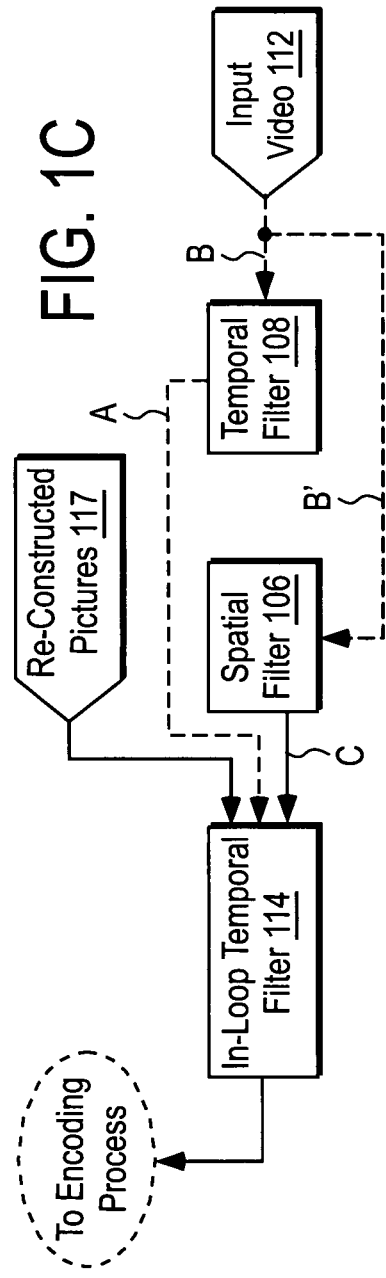
FIG. 1C is a diagrammatic view of an in-loop temporal filter according to one embodiment of the invention.

Referring now to FIG. 1C, yet another embodiment of the invention is illustrated. In this embodiment, the in-loop temporal filter is also configured to receive the reconstructed pictures 117, and is further configured to receive a signal that is the input video signal 112. In this embodiment, the input signal may be temporally filtered in temporal filter 108, where the input video 112 is received by temporal filter 108 via path B, temporally filtered, then transmitted to the in-loop filter 114 via path A. Alternatively, the input signal may also be transmitted to spatial filter 106 via path B', then spatially filtered in spatial filter 106, and transmitted to the in-loop filter 114 via path C. In either case, the result is then input into the input temporal filter 114 via paths A or C. As further discussed below and illustrated in FIG. 1D, other alternative embodiments may be preferred, where either the temporal filter, the spatial filter, or both may be used to filter the signal prior to inputting the result to the in-loop temporal filter. Also, if used together, they may be used in different orders, where the input signal may be first temporally filtered, then spatially filtered; or first spatially filtered then temporally filtered. Thus, the in-loop temporal filter 114, according to the embodiment of FIG. 1C, may receive the reconstructed pictures 117, a temporally filtered signal from temporal filter 108 and also a spatially filtered signal from spatial filter 106. The combination of temporal filter 108 and spatial filter 106 by themselves alone constitute a pre-processing system dedicated to reduce noise in the input signal and shape the frequency content of the pictures input to the encoder. The purpose of the spatial filter is to reduce high frequency spatio-temporal components to improve coding efficiency. However, these functions are ancillary to the operation of the in-loop temporal filter, which takes into account the encoding process as the mechanisms of the invention described herein, namely the reconstructed picture frames from the frame memory 116 (FIG. 1A). Whereas temporal filter 108 uses present and previous input pictures, filter 114, according to the invention, uses present pre-processed and previous reconstructed pictures taken from the frame memory 116 in the encoding process.

Also, according to the invention, the temporal filters 114, 108, can be used as illustrated, or can be combined to reduce the complexity of a system. For example, two buffers in the scheme can be reconstructed frame buffers that could also contain previously coded pictures coming from the encoder, this apart from previously filtered pictures. Motion estimation and compensation could be performed using a filtered picture at time t-1, but could also use the same picture after encoding, while a different weight would be used for generating the final filtered picture.

Figure 1D:
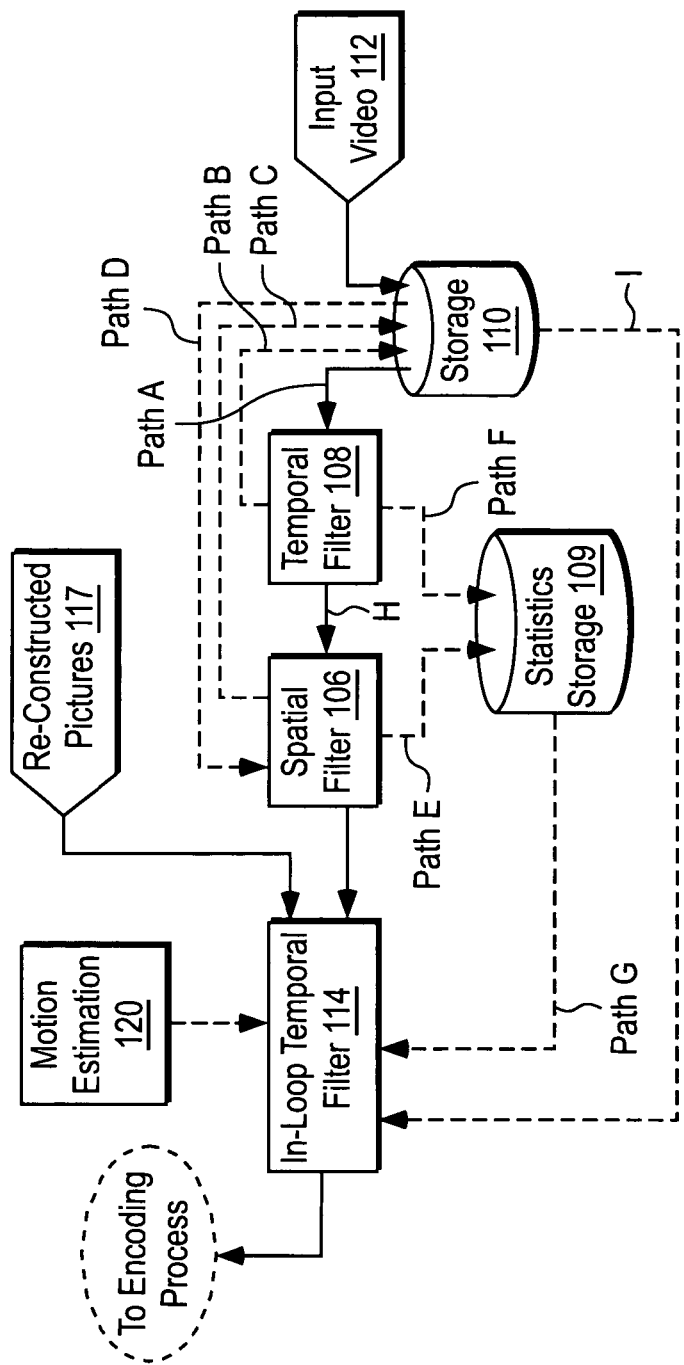
FIG. 1D is a diagrammatic view of an in-loop temporal filter according to one embodiment of the invention.

Referring now to FIG. 1D, another embodiment of the invention is illustrated. The embodiments described in relation to FIG. 1D related to pre-filtering circuits that output a pre-filtered video picture to an encoding process. In these embodiments of the pre-filtering system, the in-loop temporal filter 114 is configured to receive the reconstructed pictures 117, much like the other embodiments. Unlike the other embodiments, however, there are other intermediate processes and steps that further enhance the pre-filtered signal to be transmitted to the encoding process. The Paths A-I denote different paths of data, picture frames or other information to be transmitted during different configurations in the pre-filtering process. Also, the storage components, statistics storage 109 and storage 110, are intended as general storage devices for storing data, including data related to input picture frames, processed picture frames, as well as picture frames and related data produced within the different configurations described in relation to the different configurations described herein in relation to this FIG. 1D. Those skilled in the art will understand that different combinations and permutations of these paths, as well as whether to include or exclude any particular path is possible without departing from the spirit and scope of the invention.

In one embodiment of FIG. 1D, the input signal 112 is received and stored in the storage 110. This storage may be any number of types of electronic storage media, such as a database, or other type of electronic storage. The signal may then be retrieved by through Path A to temporal filter 108 and temporally filtered.

In one embodiment, still referring to FIG. 1D, filtering may be performed as a recursive process, where an output of temporal filter 108 is stored back in storage 110 via path B. The output of the temporal filter may then proceed directly to the spatial filter 106, where the temporally filtered data defining a picture frame is spatially filtered, then transmitted to in-loop temporal filter 114 for further filtering using the novel in-loop temporal filtering process. In this configuration, the spatial filter and the temporal filter are decoupled, and the spatial filter retrieves picture frames from memory 110, which may be frames temporally filtered immediately before retrieval by the spatial filtering, or other picture frames. Those skilled in the art will understand that there are many variations on this retrieval scheme, and that the invention is not limited to any particular one. Alternatively, the output from the temporal filter can be stored into storage 110, and the spatial filter can retrieve video picture frames on its own from storage 110 via path D.

As discussed above, the temporal filter 108 may be incorporated into or its functions performed within the in-loop temporal filter 114. In such a configuration, still referring to FIG. 1D, the spatial filter may receive an input video picture frame from storage 110, the output from the spatial filter 106 may be stored in storage 110 via Path C, and the input from the storage 110 is received by the spatial filter via Path D.

In another embodiment of FIG. 1D, a different recursive configuration has the input video signal stored in storage 110, then transmitted via Path A and temporally filtered in temporal filter 108. That output is transmitted directly to the spatial filter 106 and spatially filtered. The spatially filtered output of the spatial filter is then transmitted to the in-loop temporal filter 114 for the in-loop temporal filtering process. In this other embodiment, the spatial filter also transmits the spatially filtered output back to and stored in storage 110 via Path C. In future retrievals of picture frames from storage 110, such recursively used picture frames can be retrieved for temporal and spatial filtering, as well as other input picture frames from input video 112. In a preferred embodiment, still referring to FIG. 1D, either the spatial filter 106 or the temporal filter 108 may also store data in the input storage 110 for retrieval by the temporal filter 108. Whether filtered in one recursive manner or the other, the in-loop temporal filter is configured to receive the filtered signal in addition to the reconstructed pictures 117, and to combine these pictures in an advantageous manner, to improve the pre-filtering process and then to ultimately transmit an improved signal to the encoding process.

Still referring to FIG. 1D, in yet another embodiment of the invention, the pre-filtering process further includes statistic storage 109 configured to receive data from the spatial filter 106 via Path E and/or the temporal filter 108 via Path F. This statistic storage is configured to store data from either or both of these entities for use in the in-loop temporal filter 114 via Path G. How the in-loop temporal filter uses these different types of data is further described in more detail below. Also illustrated in FIG. 1D is an optional input from the motion estimation unit 120.

In yet another embodiment of FIG. 1D, the input video 112, after being stored in storage 110, may be first transmitted to spatial filter 106 via path D, then spatially filtered in spatial filter 106. The result may then be stored in storage 110 via path C. This result may then be transmitted to temporal filter 108 via path A, and stored back in storage via path B. This result may then be either directly transmitted to in-loop filter 114 via path I from storage 110. In this configuration, path H, occurring from the temporal filter 108 to spatial filter 106 could be eliminated, or, optionally, reversed to enable the process where the input picture is first spatially filtered, then temporally filtered prior to inputting the result to the in-loop filter 114.

In either configuration of Figure D, any number of paths can be combined to produce an improved input to the encoder process, and ultimately produce an encoded output with improved temporal correlation and reduced artifacts in the output video signal from the encoder process. Those skilled in the art will understand that there are various combinations and permutations that can be configured to produce such an output, and the invention is not limited to any particular combination.

Figure 1E:
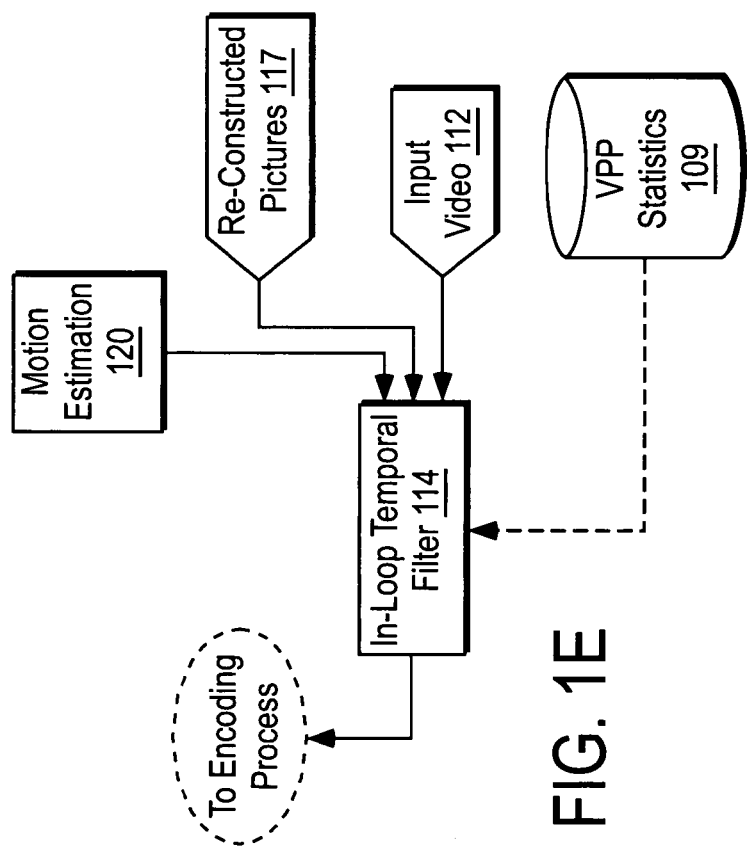
FIG. 1E is a diagrammatic view of an in-loop temporal filter according to one embodiment of the invention.

Referring now to FIG. 1E, yet another embodiment of the invention is illustrated. In this embodiment, the in-loop temporal filter 114 is configured to receive a motion vector from the motion estimation unit 120, located within the encoder process, to further enhance the pre-filtering process. This pre-filtering process ultimately transmits an improved pre-filtered signal for encoding in the encoding process. Still referring to FIG. 1E, the in-loop temporal filter is further configured to receive reconstructed pictures 117, much like the embodiments described above, and is further configured to receive video input 112. Alternatively, video pre-processing (VPP) statistics 109, discussed in more detail above, may feed into the in-loop temporal filter 114. VPP statistics may include both spatial and temporal characteristics of input video signal 112. Thus, the motion vectors received from the motion estimator 120 and the VPP statistics can be used as alternatives for the similar purposes to obtain improved results in the in-loop temporal filter functions.

According to the invention, these several embodiments may be combined in other combinations and permutations in order to improve the pre-filtering process to produce a signal that is ultimately encoded in the encoding process. Those skilled in the art will further understand that such pre-filtering process is unique in the way that the in-loop temporal filter receives reconstructed pictures from within the encoding process, combines them with the video input signal, whether spatially or temporally filtered or not, and temporally filters the signals, combining the picture frames in a manner according to a novel process, to produce a pre-filtered input for ultimate use in the encoding process.

More specifically, in the filtering architecture of the final filtered picture $\hat{f}(x, y, t)$ is generated as:

$$\hat{f}(x, y, t) = w_{Sp1} f'_{Sp1}(x, y, t) + w_{Sp2} f'_{Sp2}(x, y, t) + \sum_{k}^{[-N,N], k \neq 0} w_k f'_T(x, y, t+k)$$

where $f'_{Sp1}(x, y, t)$ and $f'_{Sp2}(x, y, t)$ are spatially filtered versions of the original picture, $f'_T(x, y, t+k)$ are motion compensated (MC) predictions from previous and past frames and $w_{Sp1}$, $w_{Sp2}$, $w_k$ are weights associated with each spatial and temporal prediction. According to the invention, the in-loop filtering can be performed as:

$$\hat{f}(x, y, t) = w_{Sp1} f'_{Sp1}(x, y, t) + w_{Sp2} f'_{Sp2}(x, y, t) + \qquad (1)$$

$$\sum_{k}^{\{-N,N\},k \neq 0} w_k f'_T(x, y, t+k) + \sum_{k}^{\{-N,-1\}} \hat{w}_k \hat{f}'_T(x, y, t+k)$$

where $\hat{f}'_T(x, y, t+k)$ is the coded version of $f'_T(x, y, t+k)$ and $\hat{w}_k$ the associated weight. Weights in general can be determined based on correlation of current picture versus original reference and coded reference (the reconstructed), distortion of coded reference (the reconstructed) versus its original, motion, texture etc. Correlation and low motion for example may suggest an increase in weighting parameters, while high texture may require a more careful adjustment of such weights.

Such filtering could, for instance, include weighted averaging between the current input picture and previously reconstructed picture. This weighting process may be based on different temporal correlation metrics such as motion characteristics, color and other factors.

The in-loop pre-filtering is performed within the encoder, and therefore is able to take advantage of already existing elements within this process, and in particular the motion estimation and compensation modules. For example, for intra slices these modules remain idle, while it may be more efficient if these were reused for performing motion estimation and compensation for filtering purposes. Generally, although the previously reconstructed data used by the encoder pre-processing is the co-located block to the current block being processed, the data used in analyzing motion characteristics, is not necessarily the co-located data but from a region around the predicted motion vector.

Those skilled in the art will understand that there are different configurations possible that may be simply a different arrangement or combination of the different components of the embodiments described herein. Such changes do not, however, depart from the spirit and scope of the invention, which is defined by the appended claims and their equivalents.

A system configured according to the invention results in a dramatic increase in correlation of the pictures prior to encoding as it takes into account the already encoded pictures with the input pictures. This is a method of reducing the distinction of temporal artifacts (i.e. a pumping/beating/pulsation picture effect), especially at the GOP boundary and giving a clearer and more vivid video presentation. According to the invention, in operation, the intermediate temporal filter 114 operates to process in temporal domain and generates a picture, adaptively based on motion content and texture content. The generated picture is the combination of the current input picture and the previously reconstructed picture. Still referring to FIG. 1A, the output from the in-loop temporal pre-filtering process provides input to a generalized encoder 102. The encoder system as illustrated is intended as a generic encoder system, and any encoder system may be configured with the pre-filtering components and functions according to the invention. The encoder illustrated receives the input 118 from the novel temporal filter 114. This input is then processed in the generalized encoder 102 that begins and ends at adder 150, to produce an improved output video bitstream. The novel filtering system of the invention is compliant with any coding standards such as ISO MPEG, and ITU-T H.26.times., and other codecs such as Microsoft Window Media and VC1, the On2 codec etc, as the mechanisms of picture improvement are restricted to the encoder side and therefore do not change the syntax and semantics of existing compression standards. To elaborate, the encoder illustrated in FIG. 1A includes an adder 150 that receives the output from the in-loop temporal filter 114, where the adder transmits a result to discrete cosine transformer 122 receiving an input signal, and a transformer 124 that may be included within a quantizer 126. The quantizer may further include a scalar module 128. The encoder further includes a variable length coder 130 that receives a quantized output from quantizer 126 and produces an output signal. The encoder further consists of an equivalent decoding module that includes an inverse quantizer 132, configured to also receive an output from the quantizer for transmission back to a feedback loop in the encoder. An inverse discrete cosine transformer 134 receives the inverse quantized output and generates a reconstructed block 146, which may be generally the difference between the current block and the reconstructed block. This output is summed in summation unit 138 to produce reconstructed current block data 140. This is the combination of the output of the inverse discrete cosine transformer 134 and motion compensator 142. The motion compensator 142 receives inputs from the frame memory 116 and further communicates with motion estimator 120 to produce an output 144, the best match reconstructed block data from frame memory 116. Outputs from the motion estimator 120 and motion compensator 142 are combined in arithmetic unit 150 to complete the feedback loop of encoder 102. The data paths include the i.sup.th picture input 118, difference data 146, motion vectors 148 the picture output 125 to variable length encoder 130 and the feedback picture for processing in generalized encoder 102. This Figure has the assumptions that the ith picture exists in frame memory or storage 116, and that the i+1th picture is being encoded with motion estimation.

Referring again to the diagram of FIG. 1A, the encoder components, generally referred to as generalized encoder 102, are provided for functional illustration of the invention used in conjunction with an encoding process, such as MPEG-2 encoding. However, and again, the invention is not limited to any particular circuit configured under any particular embodiment. In the flow chart, for inter-frame coding with IPPP GOP structure, the pictures of the i.sup.th picture and the (i+1)th picture are processed to generate block motion vectors. The block motion vectors predict where a block of pixels will be in a prior picture from the current block. For B frame coding, the block motion vectors predict where a block of pixels will be in a prior and/or subsequent picture from current block. As shown in FIG. 1A the motion vectors, once generated, are used for signaling the motion of the blocks of pixels from frame to frame.

In operation, and still referring to FIG. 1A, an input picture is received by in-loop temporal filter 114 for in-loop temporal pre-filtering according to the invention. The temporal filtering process at this point is discussed in more detail below in conjunction with FIGS. 2A through 2E.

The encoding process generates compressed bitstreams for transmission on a channel or storage in an external medium. During the encoding process, motion vectors are generated from pictures in the sequence. These pictures may not be contiguous in time; for example, motion vectors can be generated between pictures ith and (i+n)th, where n can take a value greater than or equal to 1. An input picture 118 of a subsequent picture is transmitted to the motion estimation unit 120 of the encoder 102. Motion vectors 148 are formed as the output of the motion estimation unit 120. These vectors are used by the motion compensation unit 142 to retrieve block data from previous and/or future pictures, referred to as "reference" data, for output by this unit. One output of the motion compensation unit 142 is negatively or positively summed with the output from the motion estimation unit 120 and goes to the input of the discrete cosine transformer 122. The output of the discrete cosine transformer 122 is quantized in quantizer 126. The output of the quantizer 126 is split into two outputs, 125 and 129. One output 125 goes to a downstream element, illustrated here as variable length decoder 130 for further compression and processing before transmission. The other output 129 goes through reconstruction of the encoded block of pixels for storage in frame memory 116. In the encoder shown for purposes of illustration, this second output 129 goes through an inverse quantization 132 and an inverse discrete cosine transform 134 to return a lossy version of the difference block. This data is summed with the output of the motion compensation unit 142 and returns a lossy version of the original picture to the frame memory 116.

The invention may be implemented, for example, in hardware, software (perhaps as an operating system element), or a combination of the two, a dedicated processor, or a dedicated processor with dedicated code. If in software, the invention is a process that executes a sequence of machine-readable instructions, which can also be referred to as code. These instructions may reside in various types of signal-bearing media. In this respect, the invention provides a program product comprising a signal-bearing medium or signal-bearing media tangibly embodying a program of machine-readable instructions executable by a digital processing apparatus to perform a novel method of pre-filtering video signals prior to being encoded.

The signal-bearing medium may comprise, for example, memory in server. The memory in the server may be nonvolatile storage, a data disc, or even memory on a vendor server for downloading to a processor or a quantizer for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C" or "C++". Additionally, the program code may, for example, be compressed, encrypted, or both, and may include executable files, script files and wizards for installation, as in Zip files and cab files. As used herein the term machine-readable instructions or code residing in or on signal-bearing media include all of the above means of delivery.

Referring to FIG. 2A, one embodiment of the method 200a performed by the in-loop temporal filter, in-loop temporal filter 114 (FIG. 1A), is illustrated. In step 202a, the input video signal is received, such as an input video picture frame. Also, either simultaneously, before, or after receiving the input video signal, the method is configured to receive pre-encoded picture frame data, such as reconstructed reference frames, from the encoding process in step 204a. This process may occur either before, after or simultaneously with the process of receiving input video signal. In step 206a, the novel method combines the input video signal, such as an input video picture frame, with reconstructed picture frames, such as those from frame memory 116, in step 206a. Finally, the pre-filtered video signal, such as a pre-filtered video picture frame, is output to an encoding process in step 208a. This illustration of FIG. 2A is a simplified illustration and description of the novel process performed according to the invention. Those skilled in the art will understand that there are various ways in which to perform these individual steps, however, those skilled in the art will further understand that the invention is not limited to this description or the more detailed descriptions below, but extends further to electronic filtering processes that may benefit from the novel method, including applying these functions on a regional basis or on a frame by frame basis.

Referring to FIG. 2B, a more detailed illustration of the embodiment of the FIG. 2A is illustrated. In this embodiment, the steps 202b followed by steps 206b and 208b are similar to those as described in FIG. 2A; however, other variations of the filtering process are also illustrated. For example, after the input is received in step 202b, the input may be stored in the video input storage in step 210b. From step 210b, the process may continue directly to the in-loop filtering process of step 206b, or, alternatively, the process may proceed to step 212b, where the video picture frame retrieved from the video input storage is further temporally filtered in step 212b. After step 212b, the output may be directly transmitted to the in-loop temporal filter to combine the input video frame, whether filtered or not, with reconstructed reference frames. Alternatively, the temporally filtered picture frame from step 212b may be transmitted to a spatial filter, where the temporally filtered picture frame is further spatially filtered in step 214b to produce a spatially filtered picture frame. After step 214b, the process proceeds to step 206b, where the input video frame is combined with the reconstructed reference frames. Alternatively, the input video data may be first spatially filtered in step 214b, then temporally filtered in step 212b (paths not shown); or the spatial and temporal filtering of the input picture data may occur simultaneously. Also, either or both of these processes may be incorporated into step 206b. Regardless of which process is performed, an improved pre-filtered video output is produced for use in an encoding process. Again, those skilled in the art will understand that different combinations and permutations of these steps are possible, without departing from the spirit and scope of the invention, which is defined by the appended claims and their equivalents.

Figure 2C:
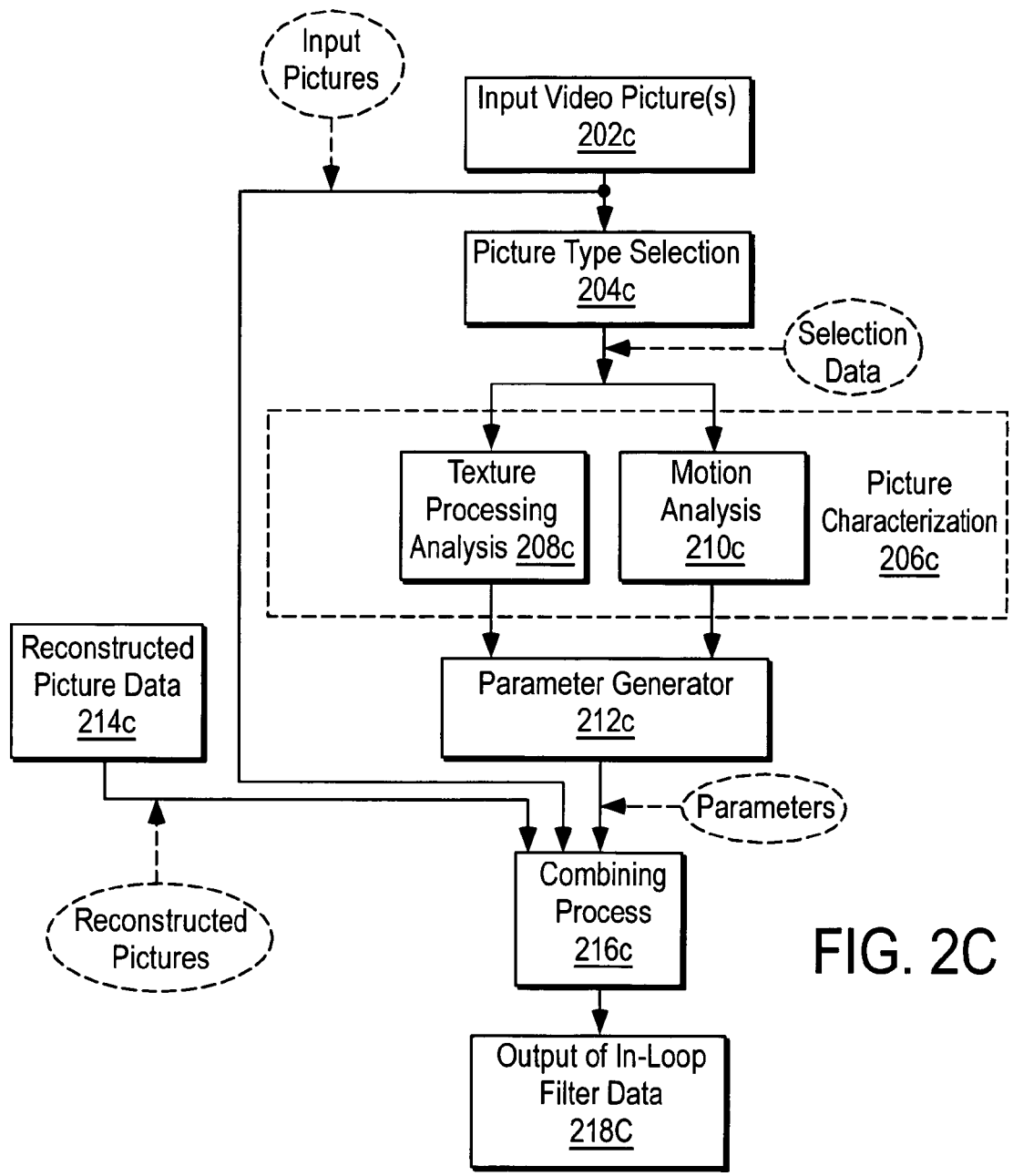
FIG. 2C is a process flow chart for an in-loop temporal filter according to one embodiment of the invention.

Referring to FIG. 2C, a more detailed description of the pre-filtering process as well as the process performed by the in-loop temporal filter is illustrated. As discussed above, the invention is not limited to any particular pre-filtering process that employs steps in addition to the combining process of reconstructed picture data from an encoder process with input picture data performed in the in-loop temporal filter according to the invention, which is defined in the appended claims. The process begins at step 202c, where an input video picture is received. The process of picture type selection is then performed in step 204c, producing selected picture data. This data is then transmitted to the picture characterization step 206c to produce characterized picture data. Here, in one embodiment, texture processing and analysis is performed in step 208c and motion analysis is performed in step 210c, where these processes are performed simultaneously or otherwise. The characterized data is then transmitted to the parameter generator process 212c, where parameters used in the combining process of the in-loop temporal filter are performed. This is discussed in more detail below. Reconstructed data is transmitted in step 214c to the combining process of step 216c, where the combining process receives the input video pictures from step 202c, the reconstructed picture data from step 214c, and the parameters from step 212c, to produce the pre-filtered output from the in-loop temporal filter in step 218c.

Figure 2D:
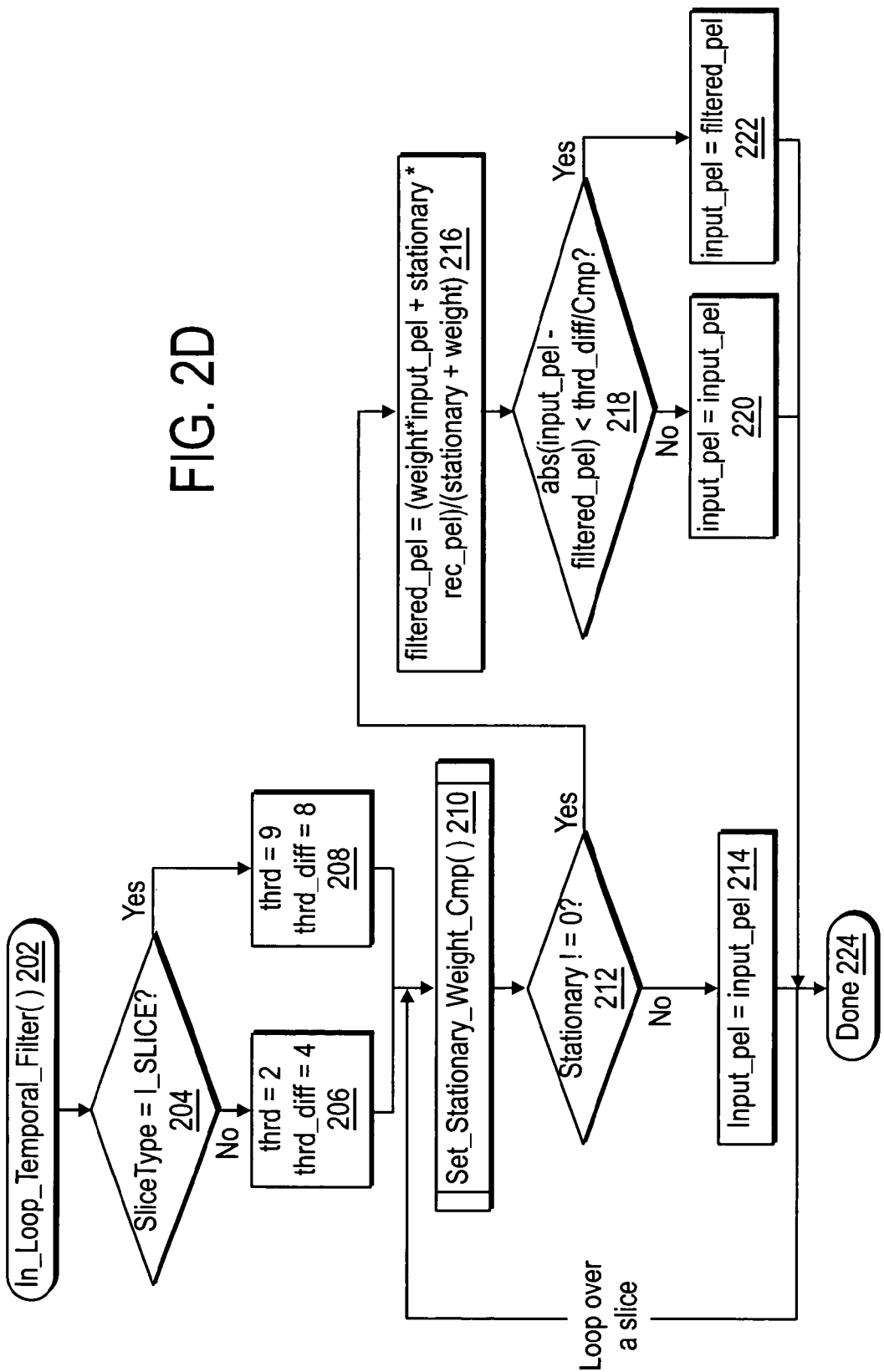
FIG. 2D is a process flow chart for an in-loop temporal filter according to one embodiment of the invention.
Figure 2E:
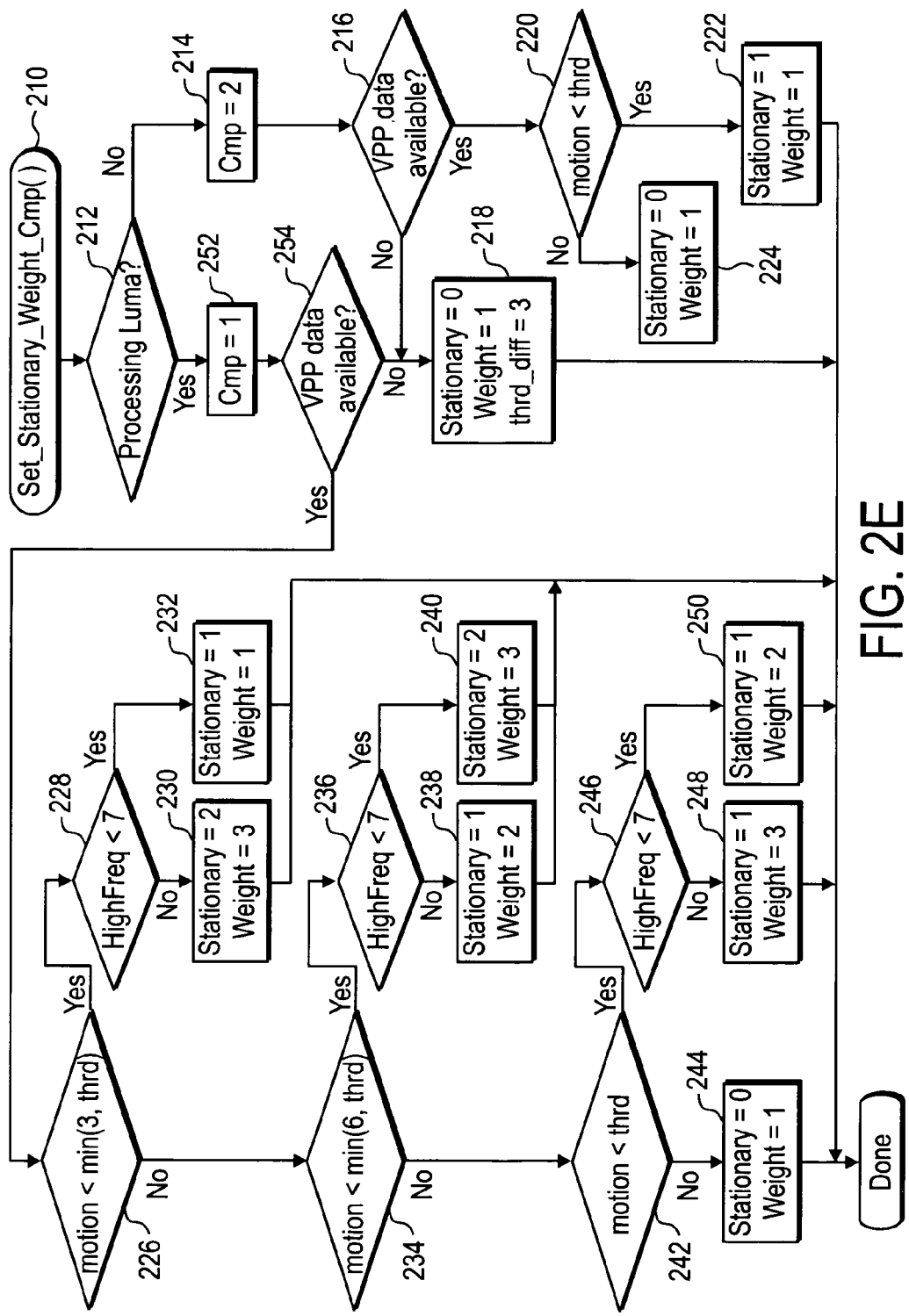
FIG. 2E is a detailed process flow chart of step 210 of FIG. 2D according to one embodiment of the invention.

Referring to FIG. 2D, a more detailed description of the process performed by one embodiment of the in-loop temporal filter is illustrated. This detailed process illustrated in FIG. 2D, and further detailed in FIG. 2E, is one enabling embodiment of the invention. However, those skilled in the art will understand that different variation of these process steps are possible, whether steps are added or removed, without departing from the spirit and scope of the invention, which is defined by the appended claims and their equivalents.

In one embodiment, if N=1 in Formula (1) and combine the first three items as, input_pel, output of the conventional spatio-temporal pre-filter, 106, as shown in FIG. 1, and denote the last item as rec_pel we have the filtered picture:

$$f(x,y)=(\text{weight}*\text{input\_pel}(x,y)+\text{stationary}*\text{rec\_pel}(x,y)/(\text{stationary}+\text{weight}) \quad (2)$$

where weight and stationary perform weighting and normalization. Referring to FIG. 2D, an embodiment flow chart of this simplified in-loop temporal pre-filter operations 200 is illustrated. The process begins at step 202, and the type of slice/frame is determined in step 204. If the type is not an I type frame, then two thresholds, (thrd=2, thrd_diff=4) are chosen in step 206. If it is an I type, the thresholds are chosen as, here (thrd=9, thrd_diff=3). Those skilled in the art will understand that the actual thresholds here, as well as those discussed below, may differ from application to application, and these are only intended as examples. Then, "stationary" and "weight" in formula (2) above as well as Cmp (Component) are computed in step 210 and is further detailed in FIG. 2E.

Referring to FIG. 2E, the weight computation starts with deciding whether luma, or luminance, is being processed in step 212. If it is not (it is chrominance), then step 214 sets the value Cmp equal to 2, which is used as a divider in 218. Then, it is determined whether video pre-processing (VPP) data, data from spatial filter 106 and/or temporal filter 108 depending on the configuration, is available in step 216. If not, then predetermined values are used, in this example stationary=0, weight=1 and thrd_diff=3, and the stationary and weight computation is complete.

Referring back to step 212, if luma is being processed, then Cmp is set equal to 1 in step 252, and it is determined in step 254 whether VPP data is available. If no, then, again, predetermined values are used, in this example stationary=0, weight=1 and threshold difference thrd_diff=3, and the stationary and weight computation is complete. If VPP values are available, then the novel process of filtering by using motion and high frequency data are performed beginning at step 226. Again, the thresholds chosen here are intended only as examples, and other predetermined thresholds can be used, and can also change throughout the process. The actual numbers relate to percentages of motion content in a block and percentages of frequency content in a block. For example, if every pixel moved in a given frame, then the motion value would be 100; if none moved, it would be zero; if 7% moved, it would be 7; and so on. Again, the values are only examples, and in no way limit the scope of the invention.

In step 226, it is determined if the motion value is less than minimum of one value, 3 for example, and a threshold, namely, min(3,thrd). In step 228, it is then determined if the high frequency is less than 7. If the high frequency is less than 7, then the stationary value stationary is set to 1, and the weight value, weight, to 1 in step 232. If not, then stationary is set to 2 and weight to 3 in step 230. Referring back to step 226, if the motion is not less than min(3,thrd), then the process goes to step 234, where it is determined if the motion value is less than min(6, thrd). If it is, then the process proceeds to step 236, it is then determined if the high frequency is less than 7. If the high frequency is less than 7, then the stationary value is set to 2, and the weight value to 3 in step 240. If not, then the stationary value is set to 1 and the weight to 2 in step 238.

Referring back to step 234, if the motion is not less than min(6, thrd), then the process goes to step 242, where it is determined if the motion value is less than thrd. If it is, then the process proceeds to step 246, it is then determined if the high frequency is less than 7. If the high frequency is less than 7, then the stationary value is set to 1, and the weight value to 2 in step 250. If not, then the stationary value is set to 1 and the weight to 3 in step 248.

Referring back to step 242, if the motion value is not less then the thrd threshold value, then the stationary value is set to 0, and the weight value is set to 1 in step 244.

Generally referring to FIG. 2E, the motion decision blocks 226, 234, 242 changes the thresholds to fine tune the motion parameters, where the decision blocks 228, 236, 246 changes the thresholds to fine tune the frequency parameters. Once the process of FIG. 2E is complete, the process proceeds back to step 212, FIG. 2D with setting of stationary, weight and Cmp.

Referring again to FIG. 2D, the process proceeds to step 212, and it is determined whether there is high or low motion by testing value stationary. If there is high motion, usually stationary=0, then the process goes to step 214 for final decision, where the current input pixel value is used for luma and chroma. If there is low or no motion, usually stationary !=0, then the process proceeds to step 216, where the filtered pixel value is computed, in terms of weight and stationary values. The process then goes to step 218 for final decision, where it is determined whether the value from step 216 is less than the threshold difference divided by Cmp, the computed value from the process of FIG. 2E. Cmp is used to differentiate luma from chroma. If no, then the current input pixel value is set to the original value I step 220. If yes, then the current input pixel value is set to the filtered pixel value in step 222.

In (2), set weight+stationary=1, we have the in-loop pre-filtering feature control and its gain control in a form of, respectively, $$f(x,y)=(1-\text{stationary})*\text{input\_pel}(x,y)+\text{stationary}*\text{rec\_pel}(x,y) \quad (3)$$

$$f(x,y)=(1-\text{gain})*\text{input\_pel}(x,y)+\text{gain}*\text{rec\_pel}(x,y) \quad (4)$$

Figure 3A:
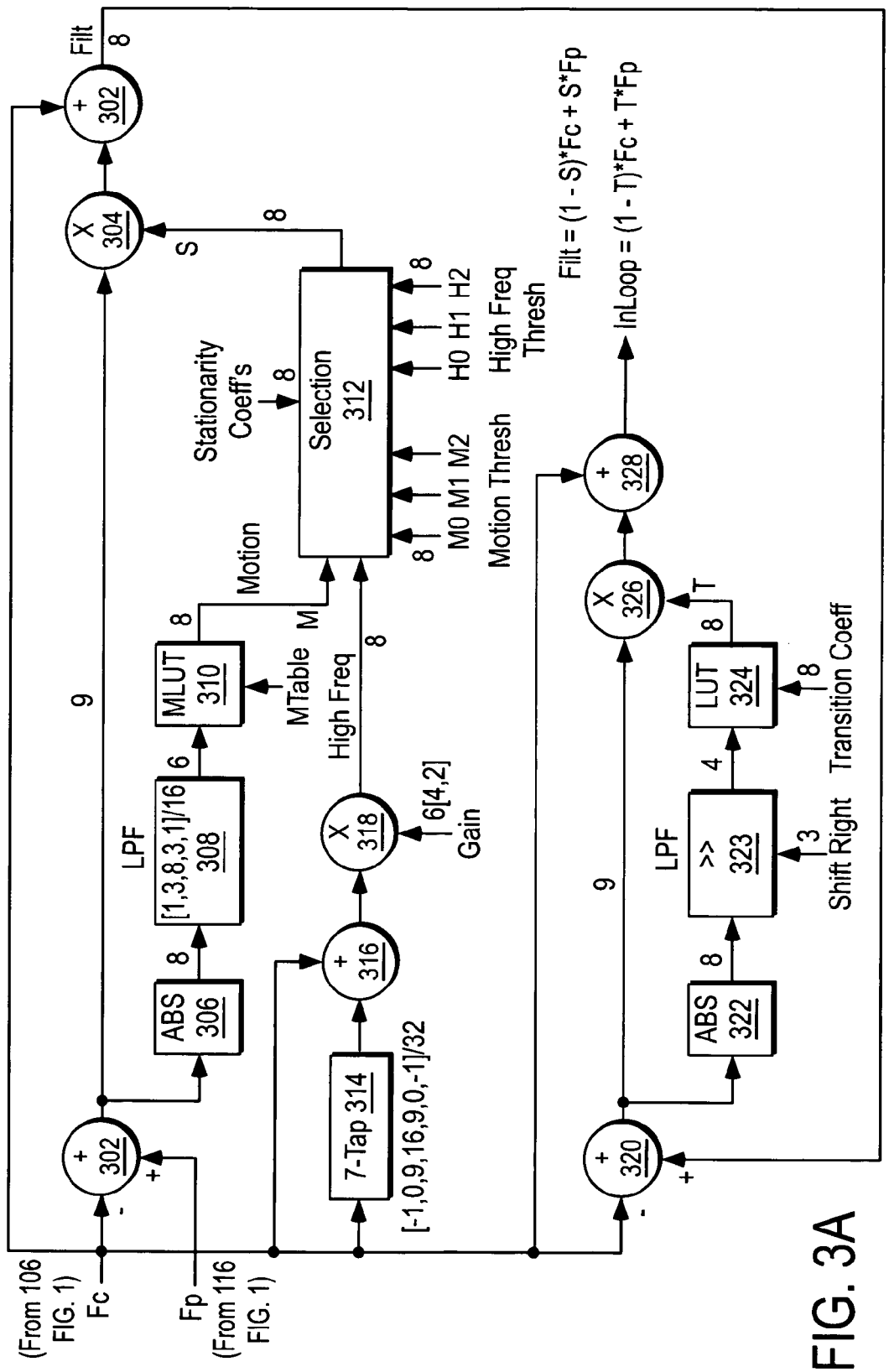
FIG. 3A is a diagrammatic view of an in-loop temporal filter according to one embodiment of the invention.

Referring to FIG. 3A, one embodiment of such a temporal filter 300 is illustrated for pre-filtering pixel frames. In this embodiment, VPP data, which come from the spatial and/or temporal filter units, may be used, but is not necessary for it to function. This is because this embodiment generates its own statistics for use in the in-loop temporal filter. The single digit numbers stationed near data lines indicate the number of bits that the line carries. However, they are intended as examples, and those skilled in the art will understand that other sizes are possible. The input Fc, the current frame block under processing, is received from spatial filter 106 (FIG. 1) and the input Fp, a previous frame block, is received from frame buffer 116 (FIG. 1). In a preferred embodiment, the previous block, Fp, is an already encoded/decoded frame typically in the nearest time sampling interval in the past.

The difference of these inputs is derived in arithmetic unit 302, and the result is sent to multiplier 304 and absolute value unit 306. The result is the difference in co-located pixels in a frame, and these differences are used by the in-loop temporal pre-filter according to the invention to produce a higher quality output video picture. The absolute value result is transmitted to low pass filter 308. It will be understood by those skilled in the art that such a low pass filter 308 has taps, namely [1,3,8,3,1], which are actually divided by 16 in practice, and it will be further understood that these values are typical examples and are in no way limiting to the invention. The low pass filter then transmits the result to the motion look-up table (MLUT) 310 to generate a value M from the MLUT. The frame changes are then manifested in this M value, which indicate whether there has been any substantial change in the current frame compared to a previous frame or frames. This value is then input into the selection unit 312 to contribute to the ultimate output signal, as described further below.

Simultaneously, the Fc value is fed into the 7-Tap filter 314, which is defined as a low pass filter. It will be understood by those skilled in the art that the 7-tap filter has tap values [−1,0,9,16,9,0,−1], which are actually divided by 32 in practice, or in integer arithmetic shifted left by 5 (>>5), and it will be further understood that these values are typical examples and are in no way limiting to the invention. The output from the 7-Tap filter is then compared to the Fc value in adder 316, then sent to gain unit 318, illustrated as a 6[4,2] bit value to produce a high frequency detail signal. Gain unit 318 controls the amount of high frequency relevant for texture detection. This value is set externally based on the statistical characteristics derived from the encoding process of the input sequence. For example, if the input sequence is determined to have global low texture, the value of gain 318 is set high so that even small textures are taken into account. The value of 318 is a range that may be from 0.25 to 15.75, for example. This high frequency result is sent to selection unit 312 along with value M. The selection unit receives as inputs motion thresholds M0, M1 and M2, as well as high frequency thresholds H0, H1 and H2, where all of the thresholds are illustrated as 8 bit values. These thresholds are predetermined in a manner to effectively choose stationarity coefficients to be used to produce an 8 bit output S shown here. The function of the stationary unit is to convert the high frequency and motion values into a stationary signal having coefficient values. High frequency values are representative of picture texture, where the amount of high frequency in a picture is an indicator of detailed textures. Those skilled in the art will understand that the thresholds may vary from application to application, and that different thresholds will produce different output values of S. The invention is not limited to any particular thresholds, or to any particular size inputs or outputs to the selection unit 312.

The stationary signal S is then multiplied by multiplication unit 304, to give an output value that is the product of the differential signal from the addition unit 302, and is added to the Fc input value to give a filtered output, shown as an 8 bit value. This 8 bit value is defined as $$Filt=(1-S)*Fc+S*Fp$$

In this embodiment, the values of (1−S) and S add up to a constant value or unity. The result of Filt is then transmitted to summation unit and summed with the Fc value, then directed down two paths, one 9 bit path shown, and another path where the absolute value of the result of Filt is calculated in absolute value unit 322, then shifted right according to a 2 bit value in shifting unit 323. This value is determined by the global amount of texture and motion detected by external means. In normal operation, an external process (not defined in this document) analyses the statistical characteristics of the input picture sequence to determine the amount of low texture, high texture, motion content, color content, etc. Transition coefficients are then determined in look up table (LUT)324 to give an 8 bit output, T, which is the final value to be blended with the original input with the filter block Filt. The value of T is multiplied in multiplier 326 with the result from adder 320. This result is then added to Fc in adder 328, giving the final output:

$$In\text{-}loop=(1-T)*Fc+T*Fp$$

This is the output 118 of the in-loop pre-filter to be used in the encoding process. Again, in this structure, the quantities (1-T) and T add up to unity (1.0).

Figure 3C:
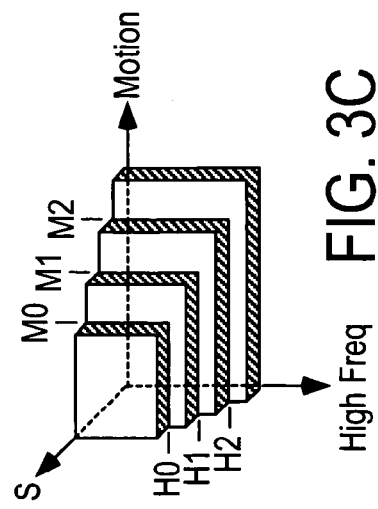
FIG. 3C is a three-dimensional graphical view illustrating the relationships of threshold values and the value of S.
Figure 3B:
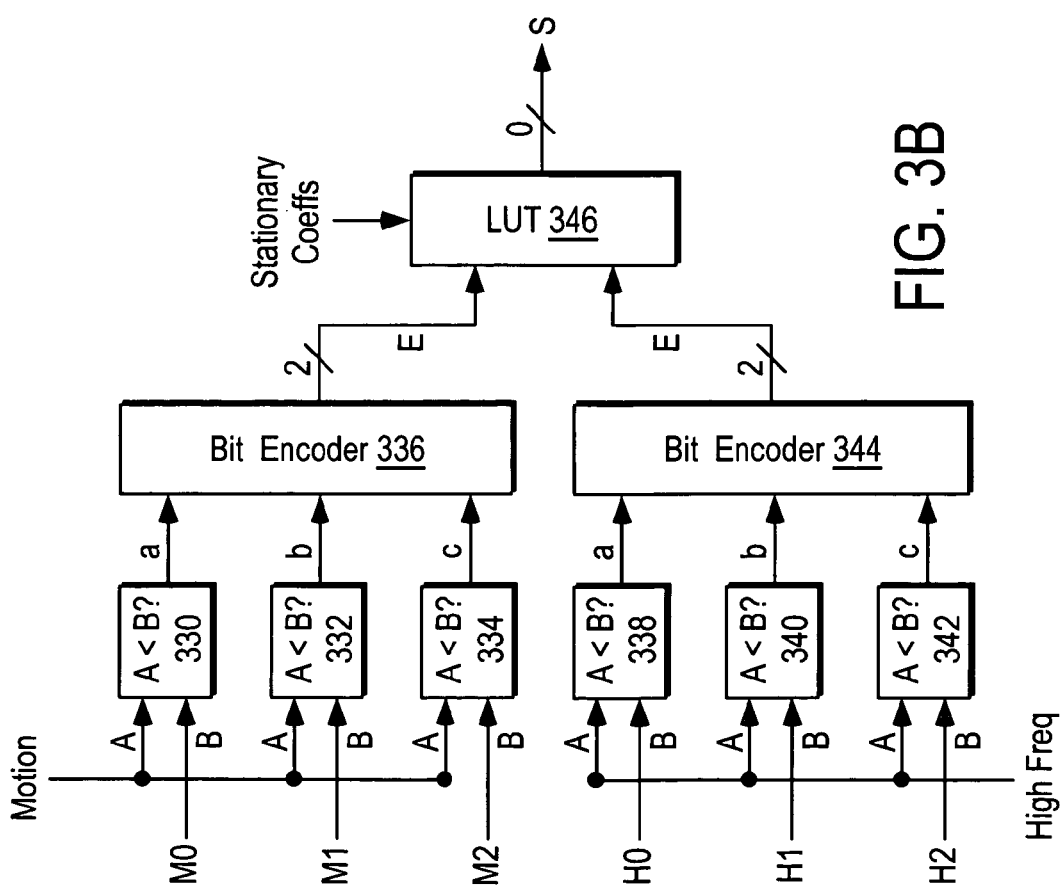
FIG. 3B is a diagrammatic view of a selection unit of FIG. 3A according to one embodiment of the invention.

Referring to FIG. 3B, a more detailed example of the selection unit is illustrated. The unit 312 is configured to receive the motion input in comparators 330, 332, 334, which each also receive separate motion threshold values M0, M1, M2, as discussed above. These values are compared, then the results a, b, c are transmitted to bit encoder 336. Similarly, the unit 312 is configured to receive the high frequency signal discussed above in each of the A inputs of the comparators 338, 340, 342, along with an individual high frequency value H0, H1, H2 into the respective B inputs to these comparators. The results, a, b, c are then sent to bit encoder 344. In each of the encoder inputs, the combinations are used to choose encoder output signal E, which may be determined by the following or similar truth table:

| abc | E |
|-----|----|
| 000 | 11 |
| 001 | 10 |
| 010 | 01 |
| 011 | 11 |
| 100 | 00 |
| 101 | 11 |
| 110 | 11 |
| 111 | 11 |

As an example, below is a table of threshold values and corresponding values of S that may result:

| Threshold values | S = |
|------------------|-----|
| M0 = 2           | 128 |
| M1 = 10          | 64  |
| M2 = 22          | 16  |
| Otherwise        | 0   |
| H0 = 4           | 96  |
| H1 = 16          | 32  |
| H2 = 32          | 8   |
| Otherwise        | 0   |

The bit encoder then encodes the separate inputs, and then sends the results to look up table (LUT) 346. The results are used to determine the output S, the stationary signal I, discussed above. I is essentially an abstraction of formulated values in a simplified manner. I can change, as the shape of the curve that represents I can change with respect to changes in thresholds. Referring to FIG. 3C, an example of a surface graph that defines possible changes in S are illustrated. The high frequency and high motion values can be different, so the graph may not be symmetrical, and can change on a three-degree level. These values can be quantified in a look up table of 16 bits or higher. The illustration shows a quantification of 16, or $2^4$.

In operation, for example, using the following GOP structure below, the In-Loop pre-filter is capable of consistently using frames with consecutive index numbers, for example:

$$I_0 P_1 P_2 P_3 P_4 P_5 P_6 P_7 I_8 P_9 P_{10} P_{11} P_{12} P_{13} \ldots$$

In this embodiment, pixels in the co-located blocks are processed, one at a time, according to the amount of motion and high frequency in a small neighborhood around the currently processed pixel. The difference between co-located pixels in the block of same polarity fields separated by one frame time is used as basis for motion detection. Temporal differences of neighboring pixels are filtered as to produce a small region-of-interest indication of motion.

In one case when there is no motion in the picture, the frame differences will be small and due only to coding noise. In this situation the value of M may be greater than 0.5 and typically close but not equal to 1.0, so that the resulting value stored in the frame buffer is, for example, 0.5*Cf+0.5*Pf. In another extreme case when large motion is detected, the value of M is 0.0 and therefore Fc goes through the system unchanged.

Referring again to FIG. 3A, FIR fixed filter coefficients are 4-bit unsigned for the LPF 308 and 5-bit signed for the 7-tap filter 314. However, it is assumed that hardware implementation will convert the FIR structures into simple shift and add operations. The input to MLUT is the lowest 6-bits (saturated to value 0x3F) out of the LPF structure. It is also possible to simplify the circuit in a manner that eliminates this MLUT altogether. Those skilled in the art will understand that there are various ways to obtain the result of M from the LPF output. The linear combination of Fc and Fp is also influenced by the amount of high frequency in the input signal. Selection logic in the diagram performs a comparison of the motion and high frequency values obtained from the Fc and Fp using two sets of thresholds in a manner indicated in the figure below.

The logic in FIG. 3B produces a three dimensional transfer function S, FIG. 3A, that has a high value when motion is low and high frequency is low. Since S is an indication of how stationary is the input video, the term Stationarity is defined to indicate this measure. The two sets of thresholds used to determine the shape of the Stationarity transfer function S are fully programmable by the firmware, as is the response of the non-linear transfer function S via the Stationarity Coeff input in the diagram.

As it is indicated in FIG. 3B, there are 16 possible 8-bit output values out of the non-linear transfer function S. The configuration illustrated provides a smooth combination of current and previous data so that when there is no motion and some high frequency information Filt will consist of more than 50% Fp, for example, in order to increase the correlation with the previous frame and therefore decrease beating effects.

The temporal filter signal Filt is further qualified by comparing it to the unfiltered current data Fc as indicated in the lower part of FIG. 3A, in the transition logic. In order to simplify processing, the absolute value of the difference between Fc and Filt is used to control the effects of the temporal filter. Under normal circumstances, if the difference is large, the filtered result Filt will not be used. This is done to prevent artifacts caused by ambiguities in the motion/high frequency sensing of the co-located blocks. Only 4 bits of the difference are used to control this decision, however, it is possible to select which 4-bits of the 8-bit absolute value are used to influence the selection. For example, if Shift Right is 0, 16 input values 0, 1, 2, . . . , 15 will be used to perform the selection. If Shift Right is 2, also 16 input values 0, 4, 8, . . . , 63 will be used as inputs to the LUT, but the accuracy will be decreased by a factor of 4. The practical range of Shift Right is 0 to 4.

The conceptual operation of the In-Loop filter depicted in FIG. 3A shows the relationship between the temporal filter and the controlled fading based on differences between the original signal and filtered signal.

Figure 4:
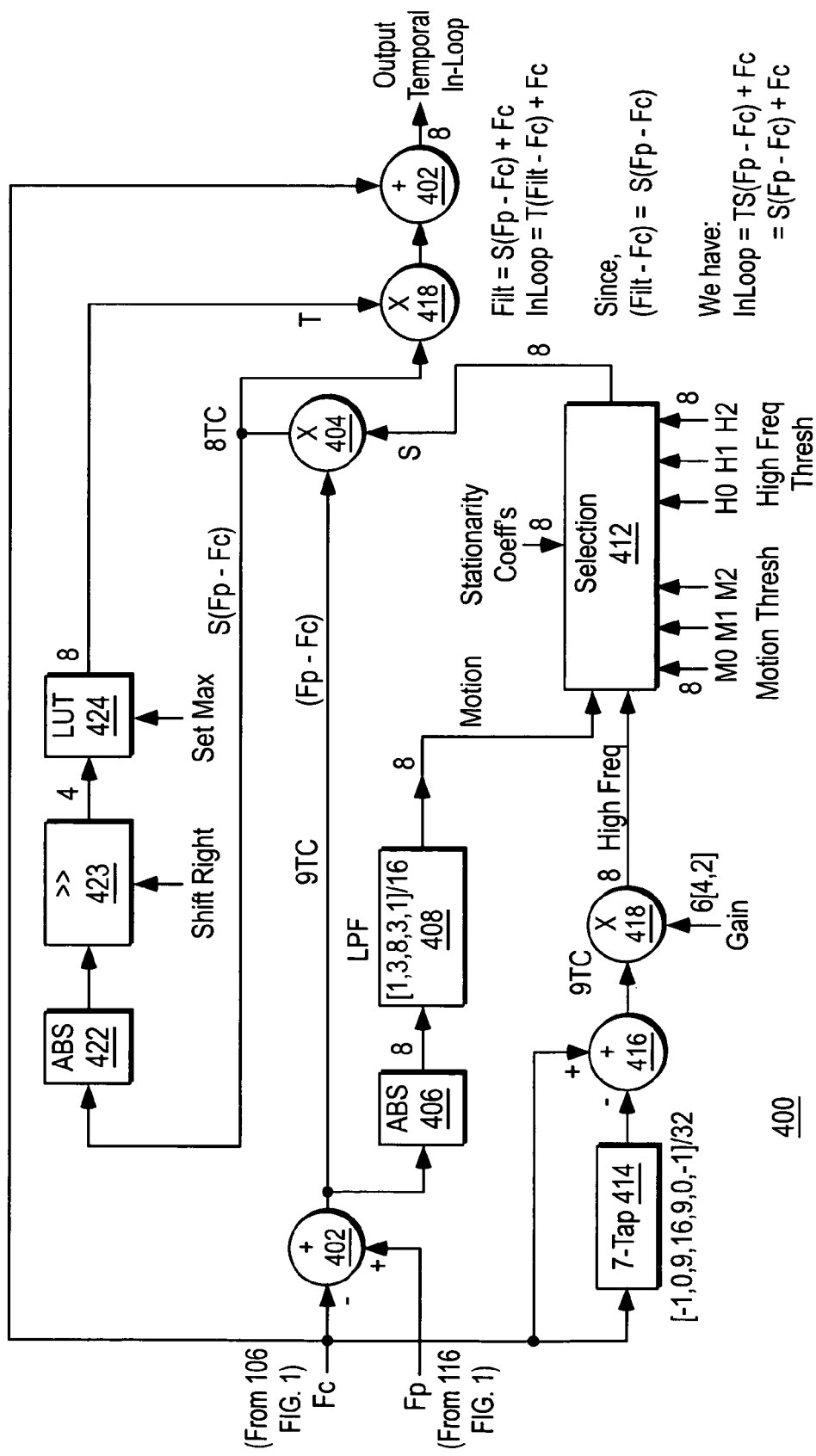
FIG. 4 is a diagrammatic view of an in-loop temporal filter according to one embodiment of the invention.

Referring now to FIG. 4, in another embodiment of the invention, a more simplified implementation may also be implemented to produce the following functions:

$$Filt = S \cdot (F_p - F_c)$$

$$InLoopOutput = T \cdot (Filt - F_c)$$

Since $$(Filt - F_c) = S \cdot (F_p - F_c)$$

After simplification and rearrangement to account for hardware dependencies, the equation becomes:

$$InLoopOutput = S \cdot (F_p - F_c) \cdot T + F_c$$

An additional simplification arises because the output of the MTF look-up table is held to a threshold. Since the contents of the MTF look-up table are monotonically decreasing with increasing input value, the MTF LUT can be omitted and the thresholding performed on the output of the motion low pass filter. Furthermore, since the output of the Stationarity Selection table is a thresholded version of the output of MLUT, a single look-up table can be used for this purpose. In contrast to the embodiment illustrated in FIG. 3, the M table has been implicitly incorporated in the Selection block in FIG. 4.

Referring to FIG. 4 in more detail, this alternative embodiment of an in-loop temporal filter 400 is illustrated, which is also configured for pre-filtering pixel frames, yet simplified. The single digit numbers stationed near data lines indicate the number of bits that the line carries. However, they are intended as examples, and those skilled in the art will understand that other sizes are possible. Like the other embodiment, the input Fc, the current frame block under processing, is received from spatial filter 106 (FIG. 1B for example) and the input Fp, a previous frame block, is received from frame buffer 116 (FIG. 1A-1E). In a preferred embodiment, the previous block, Fp, is an already encoded/decoded frame typically in the nearest time sampling interval in the past.

The difference of these inputs is derived in arithmetic unit 402, and the result is sent to multiplier 404 and absolute value unit 406. The result is the difference in co-located pixels in a frame, and these differences are used by the in-loop temporal pre-filter according to the invention to produce a higher quality output video picture. The absolute value result is transmitted to low pass filter 408. The low pass filter then transmits the result to the selection unit. Unlike the embodiment of FIG. 3A, the result is not sent to a motion look-up table (MLUT 310, FIG. 3A) to generate a value M from the MLUT.

Simultaneously, the Fc value is fed into the 7-Tap filter 414, which is defined as a low pass filter. The output from the 7-Tap filter is then compared to the Fc value in adder 416, then sent to gain unit 418, illustrated as a 6[4,2] bit value to produce a high frequency detail signal. Gain unit 418 controls the amount of high frequency relevant for texture detection. This value is set externally based on the statistical characteristics of the input sequence; for example, if the input sequence is determined to have global low texture, the value of gain 418 is set high so that even small textures are taken into account. The value of 418 may range from 0.25 to 15.75, for example. This high frequency result is sent to selection unit 412 along with value M. The selection unit receives as inputs motion thresholds M0, M1, and M2, as well as high frequency thresholds H0, H1, and H2, where all of the thresholds are illustrated as 8 bit values. These thresholds are predetermined in a manner to effectively choose stationarity coefficients to be use to produce an output, and 8 input output S shown here. The function of the stationary unit is to convert the high frequency and motion values into a stationary signal having coefficient values. High frequency values are representative of picture texture, where the amount of high frequency if a picture is an indicator of detailed textures.

The stationary signal S is then multiplied by multiplication unit 404, to give an output value that is the product of the differential signal from the addition unit 402, or (Fp-Fc), and is transmitted to the absolute value unit ABS 422, and also transmitted to multiplication unit 418. The ABS 422 then sends the absolute value result to the shift right unit 423, and that result is sent to look up table (LUT) 424. Here, the maximum threshold value is set, as discussed above. In this embodiment, since the contents of the MTF (Motion Transfer Function) LUT are monotonically decreasing with increasing input value, the MTF LUT [See LUT 324, FIG. 3A] can be omitted, and the threshold operation can be performed on the output of the motion low pass filter 423. Also, since the stationary selection table is an output limited by the threshold of the former MLUT 310 (FIG. 3), the LUT 424 is a single look-up table, and a second LUT is not needed, saving circuit components. Thus, the MTable is implicitly incorporated in selection block 412. This is because the low pass filter 308 and MLUT 310 of FIG. 3A is composed of two non-linear transfer functions occurring in a series. In the Embodiment of FIG. 4, they are reduced to one non-linear transfer function. The input control bit SetMax that is transmitted to LUT 424 is used to set the value of the transitional control signal "T" to a predetermined number, such as 256 for example, and therefore, the action of the output bending control, performed by components 302, 320, 326 and 328 of FIG. 3, obviated and effectively bypassed. This saves space and improves the performance of the circuit.

In this embodiment, the 8 bit value is now defined as $$Filt = S*(Fp-Fc)+Fc$$

and, $$\text{In-loop} = T*(Filt-Fc)+Fc$$

However, since now $$(Filt-Fc) = S*(Fp-Fc)$$

This gives:

$$\text{In-loop} = T*S*(Fp-Fc)+Fc$$

This simplifies to:

$$\text{In-loop} = S*(Fp-Fc)*T+Fc$$

Using alternative embodiment illustrated in FIG. 4 and described above, the embodiment of the system illustrated in FIGS. 3A through 3C and described above can be modified to more efficiently use hardware resources. Which of the circuits illustrated in FIG. 3A or 4 is better suited for any particular application depends on the parameters of the application. The invention is not limited to either embodiment, and is particularly broader than these two specific implementations.

The invention has been described in the context of a pre-filtering loop for an encoder, and the embodiments above are intended as examples of implementations of the invention. Those skilled in the art will understand that the invention actually has broader scope, which is defined by the appended claims and all equivalents.

We claim:

1. A method for a pre-filtering device to filter a video signal prior to digitally encoding, comprising:
   receiving at least one input picture;
   receiving at least one reconstructed picture from an encoding process;
   receiving a plurality of motion vectors from a motion estimator; and
   performing an in-loop temporal filtering process by combining the at least one input picture and the at least one reconstructed picture to output a pre-filtered video signal for use in an encoding process, wherein at least one of picture statistics and the plurality of motion vectors are applied in the in-loop temporal filtering process; and
   wherein the combining step includes:
   performing a picture type selection process to generate selected picture data;
   performing a picture characterization process to produce characterized data; and
   generating parameters based on the characterized data.

2. The method according to claim 1, wherein the in-loop temporal filtering process includes generating the picture statistics.

3. The method according to claim 1, further comprising receiving picture statistics from an external source, wherein the in-loop temporal filtering process includes separately generating the picture statistics.

4. The method according to claim 1, further comprising receiving picture statistics from a video pre-process.

5. The method according to claim 1, further comprising receiving the picture statistics from a video pre-filtering process.

6. The method according to claim 1, further comprising receiving the picture statistics from an encoding process.

7. The method according to claim 1, further comprising combining the parameters generated, the selected picture data and the reconstructed picture data to produce in-loop filtered data.

8. The method according to claim 1, wherein the step of performing an in-loop temporal filter process further includes combining the input picture and the reconstructed picture from the encoding process to output a pre-filtered video signal for use in an encoding process, and this step of combining further includes:
   performing stationary and weight computations of an input picture and a reconstructed picture to produce stationary and weight values for coefficients of a formula to generate a pre-filtered input value to an encoder that compensates for artifacts introduced by the encoding process.

9. The method according to claim 8, further comprising: means for determining whether the stationary value is substantially zero, generating a filtered value for the input picture according to a formula based on the set stationary and weight values if the motion of the input video picture is low compared to the reconstructed picture.

10. The method according to claim 8, further comprising: determining whether the stationary value is substantially zero, outputting the original input if the motion of the input video picture is high compared to the reconstructed picture.

11. A system for a pre-filtering device to filter a video signal prior to digitally encoding, comprising:
   means for receiving at least one input picture;
   means for receiving at least one reconstructed picture from an encoding process;
   means for receiving a plurality of motion vectors from a motion estimator; and
   means for performing an in-loop temporal filtering process by combining the at least one input picture and the at least one reconstructed picture to output a pre-filtered video signal for use in an encoding process wherein at least one of picture statistics and the plurality of motion vectors are applied in the in-loop temporal filtering process; and wherein the combining step includes:
performing a picture type selection process to generate selected picture data;
performing a picture characterization process to produce characterized data; and
generating parameters based on the characterized data.

12. The system according to claim 11, wherein the means for performing in-loop temporal filtering process includes means generating the picture statistics.

13. The system according to claim 11, further comprising means for receiving the picture statistics from an external source, wherein the means for performing an in-loop temporal filtering process includes means for separately generating the picture statistics.

14. The system according to claim 11, further comprising means for receiving the picture statistics from a video pre-process.

15. The system according to claim 11, further comprising means for receiving the picture statistics from a video pre-filtering process.

16. The system according to claim 11, further comprising means for receiving the picture statistics from an encoding process.

17. The system according to claim 11, further comprising means for combining the parameters generated, the selected picture data and the reconstructed picture data to produce in-loop filtered data.

18. The system according to claim 11, wherein the means for performing an in-loop temporal filter process further includes means for combining the input picture and the reconstructed picture from the encoding process to output a pre-filtered video signal for use in an encoding process, and this means for combining further includes:
means for performing stationary and weight computations of an input picture and a reconstructed picture to produce stationary and weight values for coefficients of a formula to generate a pre-filtered input value to an encoder that compensates for artifacts introduced by the encoding process.

19. The system according to claim 18, further comprising:
means for determining whether the stationary value is substantially zero, means generating a filter value for the input picture according to a formula based on the set stationary and weight values if the motion of the input video picture is low compared to the reconstructed picture.

20. The system according to claim 18, further comprising:
means for determining whether the stationary value is substantially zero, means for outputting the original input if the motion of the input video picture is high compared to the reconstructed picture.

21. A pre-filtering device for filtering a video signal prior to digitally encoding the video signal, comprising:
an in-loop temporal filter having a first input for receiving at least one input picture; having a second input for receiving at least one reconstructed picture from an encoding process; and having a third input for receiving a plurality of motion vectors from a motion estimator;
wherein the in loop temporal filter is configured to output a pre-filtered video signal for use in an encoding process by combining the at least one input picture and the at least one reconstructed picture, wherein at least one of picture statistics and the plurality of motion vectors are applied in the in-loop temporal filtering process; and wherein the combining step includes:
performing a picture type selection process to generate selected picture data;
performing a picture characterization process to produce characterized data; and
generating parameters based on the characterized data.

22. The pre-filtering device according to claim 21, further comprising statistics storage, a second temporal filter configured to temporally filter a video picture and output and store temporal statistics data to the statistics storage, and a spatial filter configured to output spatial statistic data to the statistics storage, wherein the in-loop temporal filter is configured to receive statistics data from statistics storage.

23. The pre-filtering device according to claim 22, wherein the in-loop temporal filter is configured to generate statistical data and also to receive statistical data to replace statistical data related to the spatial filtered data from the spatial filter and the temporally filtered data from the second temporal filter.

24. The pre-filtering device according to claim 22, wherein the in-loop temporal filter is configured to generate statistical data and also to receive statistical data to complement statistical data related to the spatial filtered data from the spatial filter and the temporally filtered data from the second temporal filter.

25. The pre-filtering device according to claim 21, further comprising an internal statistics generator configured to generate the picture statistics for use in an in-loop temporal filtering process.

26. The pre-filtering device according to claim 25, wherein stationary and weight values are determined based on a motion value.

27. The pre-filtering device according to claim 25, wherein the internal statistics generator is configured to determine stationary values based on preprocessing data related to motion.

28. The pre-filtering device according to claim 25, wherein the internal statistics generator is further configured with a programmable look-up table to derive stationary values from statistics generated in the in-loop pre-filtering device.

29. The pre-filtering device according to claim 27, wherein the look-up table has stationary values for use in performing an in-loop temporal filtering process.

30. The pre-filtering device according to claim 22, wherein the in-loop temporal filter is configured to generate statistical data internally with a look-up table and also to receive statistical data in addition to statistical data related to the spatial filtered data from the spatial filter and the temporally filtered data from the second temporal filter.

31. The method of claim 1, wherein the encoding process includes at least an entropy based encoding.

* * * * *